United States Patent
Sekine et al.

(10) Patent No.: US 8,804,254 B2
(45) Date of Patent: Aug. 12, 2014

(54) IMAGE PICKUP LENS

(71) Applicant: Kantatsu Co., Ltd., Yaita (JP)

(72) Inventors: Yukio Sekine, Sukagawa (JP);
Tomohiro Yonezawa, Sukagawa (JP)

(73) Assignee: Kantatsu Co., Ltd., Tochigi (JP)

( * ) Notice: Subject to any disclaimer, the term of this patent is extended or adjusted under 35 U.S.C. 154(b) by 81 days.

(21) Appl. No.: 13/737,226

(22) Filed: Jan. 9, 2013

(65) Prior Publication Data

US 2013/0182339 A1 Jul. 18, 2013

(30) Foreign Application Priority Data

Jan. 16, 2012 (JP) ................. 2012-006178

(51) Int. Cl.
G02B 9/60 (2006.01)
G02B 13/00 (2006.01)

(52) U.S. Cl.
CPC .................. G02B 9/60 (2013.01); G02B 13/0045 (2013.01)
USPC .......................................... 359/764

(58) Field of Classification Search
USPC .......................................... 359/764
See application file for complete search history.

(56) References Cited

U.S. PATENT DOCUMENTS

2014/0029113 A1* 1/2014 Lee ............................. 359/708

FOREIGN PATENT DOCUMENTS

| JP | 2005-018041 A | 1/2005 |
|---|---|---|
| JP | 2007-121743 A | 5/2007 |
| JP | 2007-122007 A | 5/2007 |
| JP | 2009-204997 A | 9/2009 |
| JP | 2011-100094 A | 5/2011 |
| JP | 2011-209677 A | 10/2011 |

* cited by examiner

Primary Examiner — James Jones
(74) Attorney, Agent, or Firm — Westerman, Hattori, Daniels & Adrian, LLP

(57) ABSTRACT

A wide-angle image pickup lens having small F-value, high resolution, and small distortion is provided. The image pickup lens is configured from, in order from an object side to an image side, a first lens having a positive refractive power with a concave surface facing the object side, an aperture stop, a second lens having a negative refractive power with a concave surface facing the image side, a third lens having a positive refractive power, a fourth lens having a positive refractive power with a concave surface facing the object side, and a fifth lens having a negative refractive power with a concave surface facing the image side.

10 Claims, 18 Drawing Sheets

SPHERICAL ABERRATION

SPHERICAL ABERRATION

FIELD CURVATURE    DISTORTION

FIELD CURVATURE　　　　　　DISTORTION

SPHERICAL ABERRATION

FIELD CURVATURE

DISTORTION

IMAGE PICKUP LENS

The present application is based on and claims priority of Japanese patent application No. 2012-006178 filed on Jan. 16, 2012, the entire contents of which are hereby incorporated by reference.

BACKGROUND OF THE INVENTION

1. Field of the Invention

The present invention relates to an image pickup lens which is mounted on a relatively small-sized camera such as a scanner, a copying machine, a network camera and the like, and which forms an image of an object on an imaging element such as a CCD sensor, a CMOS sensor and the like. Further, the present invention relates to an image pickup lens applicable to a security camera, a car-mounted camera, a game machine, a digital still camera, and a camera embedded in a mobile device and the like.

2. Description of the Related Art

Accompanying the popularization of portable phones, information terminals and smartphones having the function of a computer, performance of built-in cameras have improved, and the resolutions thereof now match that of digital still cameras. An image pickup lens mounted on the portable phone, smartphone and the like is required to have an optical performance with high-resolution and also to be downsized, so that it is required to have optical characteristics equipped with a favorable aberration correcting ability satisfying both needs.

On the other hand, application of the image pickup lens to a scanner, a copying machine, a network camera and the like has been considered recently. In the case where the image pickup lens is applied to the scanner, the copying machine, the network camera and the like, the lens is required to have wider angle in addition to high-resolution. Further, compared to the aberration correcting technique of a conventional typical image pickup lens, even higher aberration correcting technique is required. Especially, a technique of correcting distortion with high precision to even the circumferential edge portion of an imaging surface is required.

Methods for achieving widening of angle, such as making a focal length of the image pickup lens shorter, setting an entrance pupil near an image side principal point, and the like, are known. Conventional arts for realizing widening of angle and high-resolution are listed below. Japanese Patent Laid-Open No. 2011-100094 (Patent Document 1) and Japanese Patent Laid-Open No. 2011-209677 (Patent Document 2) disclose an image scanning lens as an area sensor, in place of a line sensor. The image scanning lens achieved a half angle of field of 44.8° to 53.45°, a total track length of 8.8 mm to 14.96 mm, and Fno of 2.88 to 3.00, however, it has a problem that the distortion increases in the range of approximately 70% position and above of an image height to a maximum image height. Further, it has a problem of insufficient correction of chromatic aberration of magnification. An image scanning lens disclosed in Japanese Patent Laid-Open No. 2009-204997 (Patent Document 3) has a half angle of field of 39.7° to 40.1°, a focal length of 31.0 mm to 31.98 mm, and a total track length is long at 24.0 mm to 42.3 mm. The lens achieved a distortion of ±1.0%, and a chromatic aberration of magnification of ±10 μm, however, it is not suitable for obtaining bright image since Fno is large at 4.5. Japanese Patent Laid-Open No. 2007-121743 (Patent Document 4) has a half angle of field of 32.7° to 33.0°, a focal length of 23.4 mm to 23.6 mm, and achieved a distortion of ±1.0%, however, Fno is large at 7.0. Japanese Patent Laid-Open No. 2005-018041 (Patent Document 5) has a half angle of field of 31° to 35°, a focal length of 4.30 mm to 4.90 mm, and Fno of 2.0 to 4.0, realizing a comparatively wide-angle and bright lens system, however, a distortion near 70% position to 80% position of an image height is relatively large as 2.0% to 3.5%. Further, Japanese Patent Laid-Open No. 2007-122007 (Patent Document 6) has a half angle of field of 29.5° to 37.3°, a focal length of 3.8 mm to 5.57 mm, and Fno of 2.8 to 3.0, realizing a comparatively wide-angle and bright lens system, however, a distortion in 20% position to 70% position of an image height is relatively large as 1.5% to 2.3%, and correction thereof is insufficient.

In Patent Documents 1 through 6 mentioned above, it is difficult to obtain the image pickup lens with comparatively bright image, high-resolution with various aberrations corrected satisfactorily, in particular the distortion suppressed small, and which corresponds to widening of angle. The present invention aims at providing an image pickup lens which is bright, compact, with distortion corrected satisfactorily, and has a relatively wide angle of field.

SUMMARY OF THE INVENTION

In order to solve the problems mentioned above, an image pickup lens of the present invention is configured from, in order from an object side to an image side: a first lens having a positive refractive power with a concave surface facing the object side; an aperture stop; a second lens having a negative refractive power with a concave surface facing the image side; a third lens having a positive refractive power; a fourth lens having a positive refractive power with a concave surface facing the object side; and a fifth lens having a negative refractive power with a concave surface facing the image side. The image pickup lens according to the present invention aims at widening the angle by making the curvature radius of the object side of the first lens a negative value. Further, three lenses configured from, from the object side to the image side, the positive first lens, the negative second lens, and the positive third lens has a positive composite power as a whole. By setting the positive composite power appropriately, back focus is secured, and a relatively downsized lens is achieved. Further, by appropriately balancing the powers of the first lens, the second lens, and the third lens with respect to the focal length of the overall optical system, a spherical aberration is corrected satisfactorily. Further, by appropriately balancing the powers of the positive fourth lens and the negative fifth lens with respect to the focal length of the overall optical system, field curvature and distortion are corrected satisfactorily. Further, a surface on the image side of the fifth lens is formed from an aspheric surface, and has a pole-change point at a position other than on the optical axis. By adopting such shape, it becomes possible to appropriately control an incident angle of ray to the imaging elements. The term pole-change point used here means a point on the aspheric surface with a tangent plane thereof crossing vertically with the optical axis. Further, near the optical axis, on the object side with the biconvex third lens at the center, in order from the object side, the concave-convex first lens and the convex-concave second lens are arranged, and on the image side with the biconvex third lens at the center, in order from the object side, the concave-convex fourth lens and the convex-concave fifth lens are arranged. As such, by symmetrically arranging each lens surface with the biconvex third lens at the center, the distortion is suppressed further effectively.

In order to achieve widening of angle and downsizing, the present invention makes the surface on the object side of the first lens the concave surface. By making the object side surface of the first lens the concave surface, it becomes possible to increase an angle of deviation of ray incident from off-axis. Therefore, it becomes possible to suppress a height of ray after emitting from the first lens relatively small. That is, it becomes possible to shorten the length from the first lens to the stop, and to realize widening of the angle while maintaining the total track length short.

Further, it is desirable that the image pickup lens of the present invention satisfies a following conditional expression (1):

$$-70.0 < r1/f < 0 \quad (1)$$

where
r1: curvature radius of object side surface of first lens
f: focal length of overall optical system.

The conditional expression (1) is a condition for correcting the field curvature satisfactorily, while seeking widening of the angle. If the value is above the upper limit of the conditional expression (1), the shape of the object side of the first lens becomes a convex surface, so that it is disadvantageous in widening of the angle. Further, the length from the first lens to the stop becomes longer, so it is disadvantageous in shortening of the total track length. Further, with respect to the field curvature, it is not preferable especially since a tangential image surface inclines to the object side. On the other hand, if the value is below the lower limit, it is advantageous in widening of the angle, however, the chromatic aberration at high image height deteriorates.

With respect to the conditional expression (1), a better effect may be obtained by setting the same to the range below.

$$-70.0 < r1/f < -3.0 \quad (1a)$$

By setting the upper limit value of the conditional expression (1a) to −3.0, it becomes possible to decrease a SAG amount of the surface on the object side of the first lens, directed to the object side. The term SAG amount means a distance parallel to the optical axis from a surface at height h from the optical axis to the lens surface when taking a surface orthogonal to the optical axis including a point of intersection between the lens surface and the optical axis as a reference. Therefore, it becomes possible to shorten the total track length, in the case of including the circumferential edge portion of an effective diameter of the first lens.

Further, it is desirable that the image pickup lens of the present invention satisfies following conditional expressions (2) and (3).

$$-1.20 < r2/r3 < -0.40 \quad (2)$$

$$1.56 < r3/r4 < 3.0 \quad (3)$$

where
r2: curvature radius of image side surface of first lens
r3: curvature radius of object side surface of second lens
r4: curvature radius of image side surface of second lens.

The conditional expressions (2) and (3) are conditions for correcting the field curvature and the spherical aberration favorably. If the value is above the upper limit of the conditional expressions (2) and (3), with respect to the field curvature, especially the tangential image surface inclines to the object side. Further, it is unfavorable since a displacement of a short-wavelength component of the spherical aberration to the image side in a near-axis region increases. On the other hand, if the value is below the lower limit of the conditional expressions (2) and (3), it is unfavorable with respect to the field curvature, especially since the tangential image surface inclines to the image side.

Further, it is desirable that the image pickup lens of the present invention satisfies the following conditional expression (4).

$$-2.0 < r8/r10 < -0.63 \quad (4)$$

where
r8: curvature radius of image side surface of fourth lens
r10: curvature radius of image side surface of fifth lens.

By defining the ratio of the curvature radii of the image side surfaces of each of the fourth lens and the fifth lens to an appropriate range with the conditional expression (4), it becomes possible to maintain image-side telecentric properties and prevent decrease of relative illumination, and to correct the field curvature satisfactorily. If the value is above the upper limit of the conditional expression (4), the incident angle of ray to the imaging elements becomes large, and the light intensity to peripheral portion decreases, so that it is unfavorable. Further, it is unfavorable with respect to the field curvature, especially since the tangential image surface inclines to the object side. On the other hand, if the value is below the lower limit, it is easier to control the incident angle of ray to the imaging elements, however it is unfavorable with respect to the field curvature, especially since the tangential image surface inclines to the image side.

Further, it is desirable that the image pickup lens of the present invention satisfies the following conditional expression (5).

$$1.0 < r1/r2 < 120 \quad (5)$$

The conditional expression (5) is a condition for seeking widening of the angle and at the same time achieving downsizing, by defining the relationship between the curvature radius of the object side surface and the curvature radius of the image side surface with respect to the meniscus shape of the first lens. If the value is above the upper limit, the chromatic aberration at high image height deteriorates. On the other hand, if the value is below the lower limit of the conditional expression (5), the power of the first lens becomes small, so that it becomes difficult to widen the angle and to downsize.

Further, it is desirable that the image pickup lens of the present invention satisfies the following conditional expression (6).

$$0.50 < r3/f < 1.20 \quad (6)$$

The conditional expression (6) is a condition for securing appropriate back focus, downsizing, and correcting the field curvature favorably. If the value is above the upper limit of the conditional expression (6), the back focus becomes too long so that it is disadvantageous for downsizing. Further, with respect to the field curvature, especially the tangential image surface inclines to the object side. On the other hand, if the value is below the lower limit of the conditional expression (6), it is advantageous in downsizing but the spherical aberration at high image height deteriorates.

DETAILED DESCRIPTION OF THE PREFERRED EMBODIMENTS

Now, embodiments of the present invention will be explained in detail with reference to the drawings.

FIG. 1, FIG. 4, FIG. 7, FIG. 10, FIG. 13 and FIG. 16 respectively are general configuration diagrams of the image pickup lenses of Embodiments 1 through 6 of the present embodiment. The basic lens configuration is identical in all embodiments, so that an explanation is given on the imaging lens configuration of the present embodiment with reference to the general configuration diagram of Embodiment 1.

Figure 1:
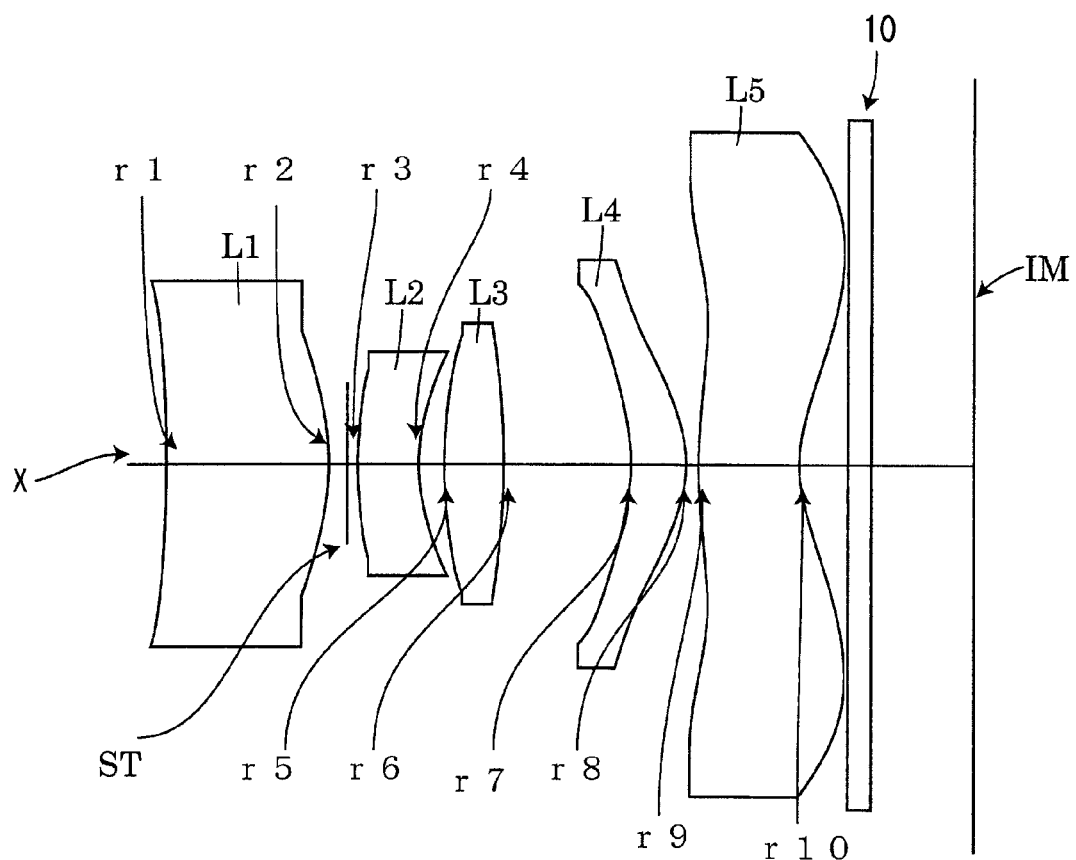
FIG. 1 is a configuration diagram of an image pickup lens according to Embodiment 1 of an embodiment of the present invention.

As shown in FIG. 1, an image pickup lens of the present embodiment is configured from an arrangement, in order from an object side to an image side, of a first lens L1 having a positive refractive power, an aperture stop ST, a second lens L2 having a negative refractive power, a third lens L3 having a positive refractive power, a fourth lens L4 having a positive refractive power, and a fifth lens L5 having a negative refractive power. A filter 10 is arranged between the fifth lens L5 and an image plane IM.

In the image pickup lens of the above-mentioned configuration, the first lens L1 is a meniscus lens having the positive refractive power, with an object side surface r1 of a concave surface and an image side surface r2 of a convex surface near an optical axis. The second lens L2 is a meniscus lens having the negative refractive power, with an object side surface r3 of a convex surface and an image side surface r4 of a concave surface near the optical axis. The third lens L3 is a biconvex lens having the positive refractive power, with an object side surface r5 of a convex surface and an image side surface r6 of a convex surface near the optical axis. The fourth lens L4 is a meniscus lens having the positive refractive power, with an object side surface r7 of a concave surface and an image side surface r8 of a convex surface near the optical axis. The fifth lens L5 is a meniscus lens having the negative refractive power, with an object side surface r9 of a convex surface and an image side surface r10 of a concave surface near the optical axis.

Near the optical axis, the above-mentioned configuration is, in order from the object side, the concave-convex first lens L1, the convex-concave second lens L2, the biconvex third lens L3, the concave-convex fourth lens L4, and the convex-concave fifth lens L5, with the concave surface and convex surface of each meniscus lens being arranged symmetrically toward the third lens L3 arranged in the center. Further, the object side surface r9 of the fifth lens L5 is formed in an aspheric shape taking the convex surface near the optical axis and the concave surface in the surrounding portion, and the image side surface r10 of the fifth lens L5 is formed in an aspheric shape taking the concave surface near the optical axis and the convex surface in the surrounding portion.

The image pickup lens according to the present embodiment satisfies conditional expressions (1) through (6) below. With the image pickup lens of the present embodiment, widening of the angle, downsizing, and satisfactory correction of aberration are realized.

$$-70.0 < r1/f < 0 \quad (1)$$

$$-1.20 < r2/r3 < -0.40 \quad (2)$$

$$1.56 < r3/r4 < 3.0 \quad (3)$$

$$-2.0 < r8/r10 < -0.63 \quad (4)$$

$$1.0 < r1/r2 < 120 \quad (5)$$

$$0.50 < r3/f < 1.20 \quad (6)$$

where
f: overall focal length
r1: curvature radius of object side surface of first lens
r2: curvature radius of image side surface of first lens
r3: curvature radius of object side surface of second lens
r4: curvature radius of image side surface of second lens
r8: curvature radius of image side surface of fourth lens
r10: curvature radius of image side surface of fifth lens It is not necessary to satisfy all the conditional expressions at the same time. Satisfying each conditional expression separately will make it possible to obtain the effect corresponding to each conditional expression.

Further, in the image pickup lens of the present embodiment, a maximum image height IH is set to 4.952 mm (corresponds to ½ inch), envisaging application to comparatively large imaging elements, however, it goes without saying that it is possible to apply the same to a small-sized imaging element.

In Embodiments 1 through 5 according to the present embodiment, an object distance is set to 450 mm, and in Embodiment 6 the object distance is set to infinity. That is, the present invention is capable of being applied to, for example, an image scanning lens used in a finite system, and to an image pickup lens used in an infinite system.

In the present embodiment, the lens surface of each lens is formed from an aspherical surface. The aspherical shape adopted in these lens surfaces are represented by the following expression, when an axis in an optical axis direction is denoted as Z, a height in a direction orthogonal to the optical axis is H, a conic constant is k, and aspheric coefficients are A4, A6, A8, A10, A12, A14, and A16.

$$Z = \frac{\frac{H^2}{R}}{1 + \sqrt{1 - (k+1)\frac{H^2}{R^2}}} + A_4 H^4 + A_6 H^6 +$$

$$A_8 H^8 + A_{10} H^{10} + A_{12} H^{12} + A_{14} H^{14} + A_{16} H^{16}$$

Equation 1

Next, embodiments of the image pickup lens according to the present embodiment are shown. In each embodiment, f represents a focal length of the overall lens system, Fno represents an F number, and ω represents a half angle of field. Further, i represents a surface number counted from the object side, r represents a curvature radius, d represents a distance between lens surfaces on optical axis (surface distance), Nd represents a refractive index with respect to d-ray (reference wavelength), and νd represents an Abbe number with respect to d-ray. Aspheric surface will be represented with a sign * (asterisk) after the surface number i.

Embodiment 1

Basic lens data will be shown in Table 1 below.

TABLE 1

| f = 6.3161 mm | | Fno = 3.00 | | ω = 38.09° |
|---|---|---|---|---|
| | | Surface data | | |
| Surface No. i | Curvature radius r | Surface distance d | Refractive index Nd | Abbe number ν d |
| (Object surface) | Infinity | 450.0 | | |
| 1* | −25.00 | 2.0860 | 1.5346 | 56.16 |
| 2* | −3.2214 | 0.2385 | | |
| Stop | Infinity | 0.1336 | | |
| 3* | 5.6570 | 0.7827 | 1.634 | 23.9 |
| 4* | 2.3194 | 0.3283 | | |
| 5* | 6.2226 | 0.7653 | 1.5346 | 56.16 |
| 6* | −12.2418 | 1.65 | | |
| 7* | −2.7646 | 0.7127 | 1.5346 | 56.16 |
| 8* | −1.6998 | 0.15 | | |
| 9* | 5.7013 | 1.3067 | 1.5346 | 56.16 |
| 10* | 1.8889 | 0.62 | | |
| 11 | ∞ | 0.30 | 1.5167 | 64.19 |
| 12 | ∞ | 1.3005 | | |
| (Image plane) | ∞ | | | |

| Focal length of each lens |
|---|
| f1 = 6.665 |
| f2 = −6.745 |
| f3 = 7.797 |
| f4 = 6.663 |
| f5 = −5.977 |

| Aspheric data | |
|---|---|
| First surface | k = 0.00, A4 = −3.3091e−003, A6 = 2.0666e−004, A8 = −4.343e−005, A10 = 4.063e−006, A12 = 0, A14 = 0, A16 = 0 |
| Second surface | k = −5.7276, A4 = 9.6631e−003, A6 = −7.9901e−003, A8 = 3.3424e−003, A10 = −7.9921e−004, A12 = 8.3452e−005, A14 = 0, A16 = 0 |
| Third surface | k = −8.418, A4 = 1.14e−002, A6 = 5.5508e−003, A8 = 1.3206e−003, A10 = −1.3529e−004, A12 = 0, A14 = 0, A16 = 0 |
| Fourth surface | k = −1.5523, A4 = −2.73e−002, A6 = 1.285e−002, A8 = −4.7991e−003, A10 = 1.1462e−003, A12 = −1.3477e−004, A14 = 0, A16 = 0 |
| Fifth surface | k = 0.00, A4 = −6.3507e−003, A6 = 2.4724e−003, A8 = −3.2479e−005, A10 = 7.3793e−005, A12 = −2.0729e−005, A14 = 0, A16 = 0 |
| Sixth surface | k = 0.00, A4 = −2.9756e−004, A6 = −7.2858e−004, A8 = −4.1378e−004, A10 = 1.9035e−004, A12 = −8.5075e−006, A14 = 0, A16 = 0 |
| Seventh surface | k = 0.1908, A4 = 3.22e−002, A6 = −1.2342e−003, A8 = −1.7567e−004, A10 = 4.1358e−005, A12 = −3.447e−006, A14 = 0, A16 = 0 |
| Eighth surface | k = −2.603, A4 = 2.5784e−003, A6 = 1.467e−003, A8 = 5.4068e−005, A10 = −4.135e−005, A12 = 1.4199e−006, A14 = 1.3412e−007, A16 = 0 |
| Ninth surface | k = −5.0722, A4 = −1.77e−002, A6 = 1.2782e−003, A8 = −2.9348e−005, A10 = 0, A12 = 0, A14 = 0, A16 = 0 |
| Tenth surface | k = −5.7508, A4 = −9.5181e−003, A6 = 6.9494e−004, A8 = −4.6002e−005, A10 = 1.4581e−006, A12 = −1.5065e−008, A14 = 0, A16 = 0 |

Value of each conditional expression $r1/f = -3.9581$            (1)

$r2/r3 = -0.5694$            (2)

$r3/r4 = 2.4389$            (3)

$r8/r10 = -0.8998$            (4)

$r1/r2 = 7.7604$            (5)

$r3/f < 0.8956$            (6)

As seen from above, the image pickup lens according to Embodiment 1 satisfies above-mentioned conditional expressions (1) through (6). Further, a distance TTL on the optical axis X from the object side surface of the first lens L1 to the image plane IM (air-converted distance) is 10.27 mm. A ratio TTL/(2IH) with the maximum image height (IH) is 1.036, so that downsizing is achieved.

Further, a ratio of the focal length of each lens with respect to the focal length of the overall system is as follows.

$f1/f = 1.055$
$f2/f = -1.067$
$f3/f = 1.234$
$f4/f = 1.054$
$f5/f = -0.946$

As explained above, by setting the focal length of each lens to a value close to the focal length of the overall system, or to a value longer than the focal length of the overall system, increase of the manufacturing error sensitivity is suppressed.

Figure 2:
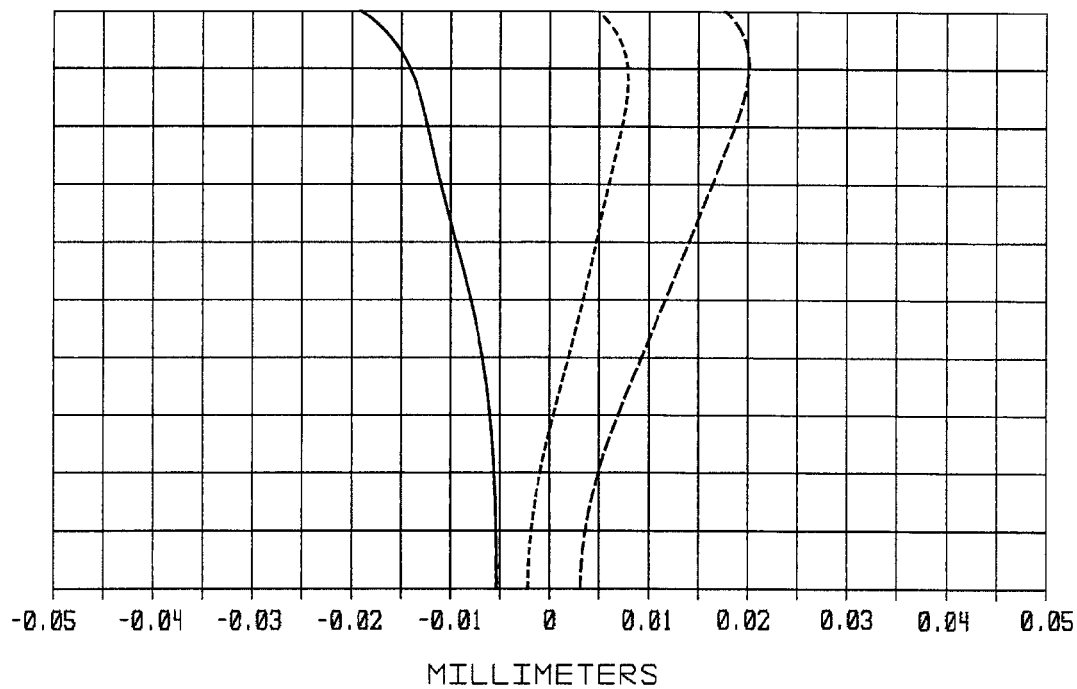
FIG. 2 is a diagram showing a spherical aberration of the image pickup lens according to Embodiment 1.
Figure 3:
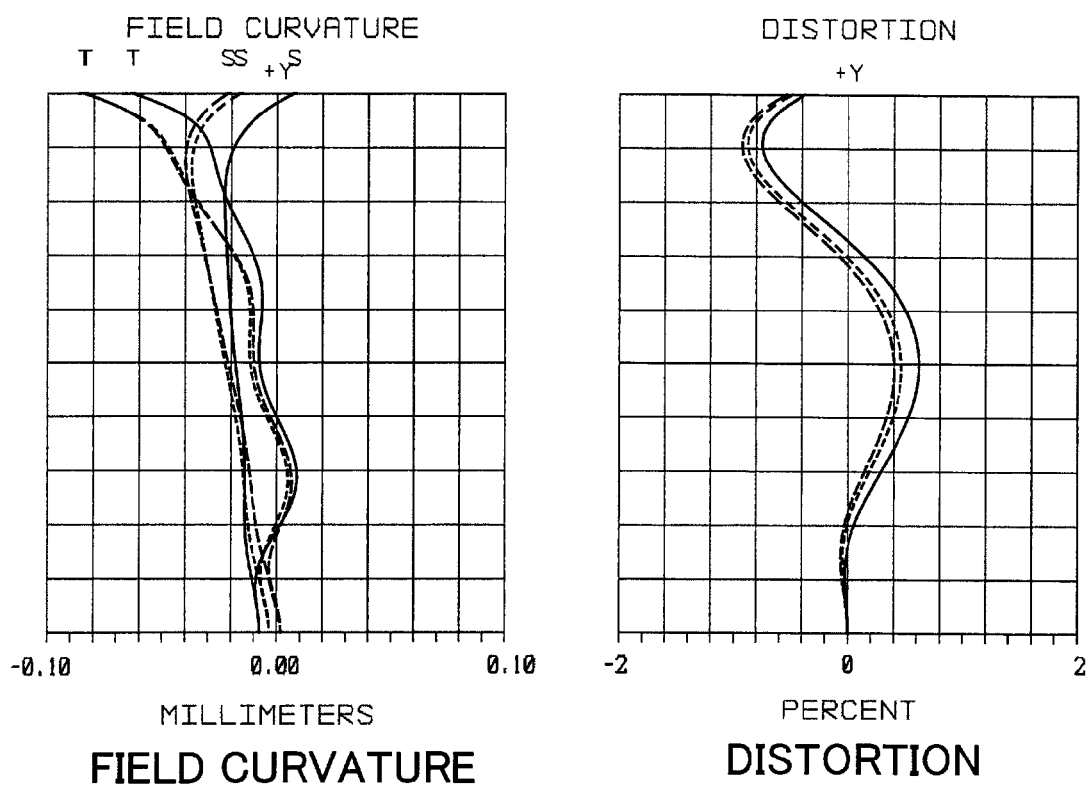
FIG. 3 is a diagram showing a field curvature and a distortion of the image pickup lens according to Embodiment 1.
Figure 4:
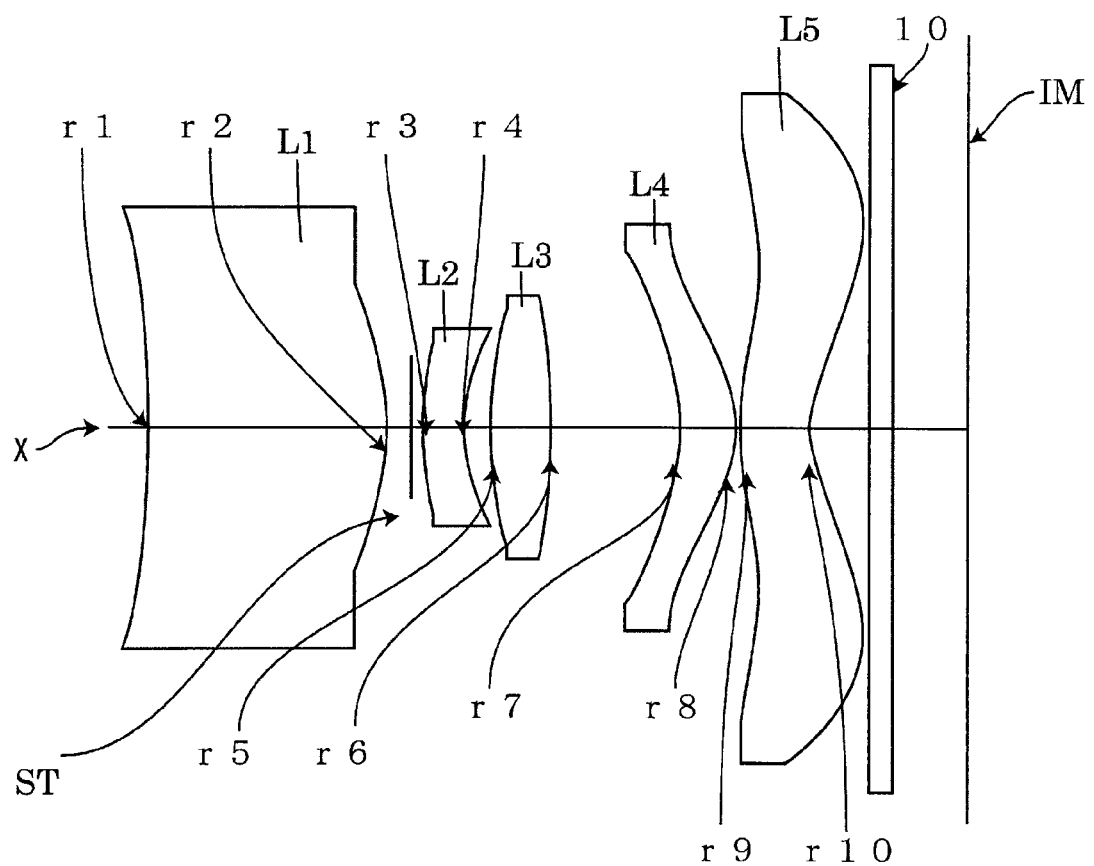
FIG. 4 is a configuration diagram of an image pickup lens according to Embodiment 2 of an embodiment of the present invention.

FIG. 2 shows a spherical aberration of the image pickup lens of Embodiment 1. Solid line represents measured values for a wavelength of 486.13 nm, dotted line represents measured values for a wavelength of 587.56 nm, and dashed line represents measured values for a wavelength of 656.27 nm. FIG. 3 shows a field curvature and a distortion of the image pickup lens of Embodiment 1. As shown in FIG. 2 and FIG. 3, various aberrations are satisfactorily corrected in the image pickup lens of the Embodiment 1.

Embodiment 2

Basic lens data will be shown in Table 2 below.

TABLE 2

| f = 5.3411 mm | | Fno = 2.97 | | ω = 42.83° |
|---|---|---|---|---|
| | | Surface data | | |
| Surface No. i | Curvature radius r | Surface distance d | Refractive index Nd | Abbe number ν d |
| (Object surface) | Infinity | 450.0 | | |
| 1* | −17.5772 | 3.0061 | 1.5346 | 56.16 |
| 2* | −2.8349 | 0.3133 | | |
| Stop | Infinity | 0.1404 | | |
| 3* | 4.4212 | 0.5314 | 1.634 | 23.9 |
| 4* | 1.9843 | 0.3300 | | |
| 5* | 5.1042 | 0.7568 | 1.5346 | 56.16 |
| 6* | −11.6640 | 1.6472 | | |
| 7* | −2.5235 | 0.71 | 1.5346 | 56.16 |
| 8* | −1.4436 | 0.0342 | | |
| 9* | 3.3350 | 0.8858 | 1.5346 | 56.16 |
| 10* | 1.3464 | 0.75 | | |
| 11 | ∞ | 0.300 | 1.5167 | 64.19 |
| 12 | ∞ | 0.9385 | | |
| (Image plane) | ∞ | | | |

| Focal length of each lens |
|---|
| f1 = 5.877 |
| f2 = −6.133 |
| f3 = 6.719 |
| f4 = 5.110 |
| f5 = −4.981 |

| Aspheric data | |
|---|---|
| First surface | k = 0.00, A4 = −2.279e−003, A6 = 2.089e−004, A8 = −3.171e−005, A10 = 1.976e−006, A12 = 0, A14 = 0, A16 = 0 |
| Second surface | k = −6.949, A4 = 8.613e−003, A6 = −8.701e−003, A8 = 3.851e−003, A10 = −8.89e−004, A12 = 8.473e−005, A14 = 0, A16 = 0 |
| Third surface | k = −2.962, A4 = 1.432e−002, A6 = −1.304e−002, A8 = 2.813e−003, A10 = 5.353e−004, A12 = 0, A14 = 0, A16 = 0 |
| Fourth surface | k = −1.769, A4 = −2.943e−002, A6 = 1.189e−002, A8 = −5.581e−003, A10 = 1.591e−003, A12 = −1.348e−004, A14 = 0, A16 = 0 |
| Fifth surface | k = 0.00, A4 = −9.245e−003, A6 = 3.445e−004, A8 = −1.385e−004, A10 = −1.27e−004, A12 = 2.014e−005, A14 = 0, A16 = 0 |
| Sixth surface | k = 0.00, A4 = −4.303e−003, A6 = 3.438e−004, A8 = −3.22e−004, A10 = 1.584e−004, A12 = 2.158e−007, A14 = 0, A16 = 0 |
| Seventh surface | k = −0.0473, A4 = 3.379e−002, A6 = −2.298e−003, A8 = −2.683e−006, A10 = 4.665e−005, A12 = −6.256e−006, A14 = 0, A16 = 0 |

TABLE 2-continued

| | |
|---|---|
| Eighth surface | k = −3.186, A4 = −1.877e−003, A6 = 2.036e−003, A8 = 9.968e−005, A10 = 3.777e−005, A12 = 1.468e−006, A14 = 8.955e−010, A16 = 0 |
| Ninth surface | k = −4.319, A4 = −1.972e−002, A6 = 1.382e−003, A8 = −3.083e−005, A10 = 0, A12 = 0, A14 = 0, A16 = 0 |
| Tenth surface | k = −4.809, A4 = −1.105e−002, A6 = 1.382e−003, A8 = −5.493e−005, A10 = 1.824e−006, A12 = −1.863e−008, A14 = 0, A16 = 0 |

Value of each conditional expression $r1/f = -3.2909$ (1)

$r2/r3 = -0.6412$ (2)

$r3/r4 = 2.2280$ (3)

$r8/r10 = -1.0721$ (4)

$r1/r2 = 6.2001$ (5)

$r3/f = 0.8277$ (6)

As seen from above, the image pickup lens according to Embodiment 2 satisfies above-mentioned conditional expressions. Further, a distance TTL on the optical axis X from the object side surface of the first lens L1 to the image plane IM (air-converted distance) is 10.24 mm. A ratio TTL/(2IH) with the maximum image height (IH) is 1.033, so that downsizing is achieved.

Further, a ratio of the focal length of each lens with respect to the focal length of the overall system is as follows.

$f1/f = 1.100$
$f2/f = -1.148$
$f3/f = 1.257$
$f4/f = 0.956$
$f5/f = -0.932$

As explained above, by setting the focal length of each lens to a value close to the focal length of the overall system, or to a value longer than the focal length of the overall system, increase of the manufacturing error sensitivity is suppressed.

Figure 5:
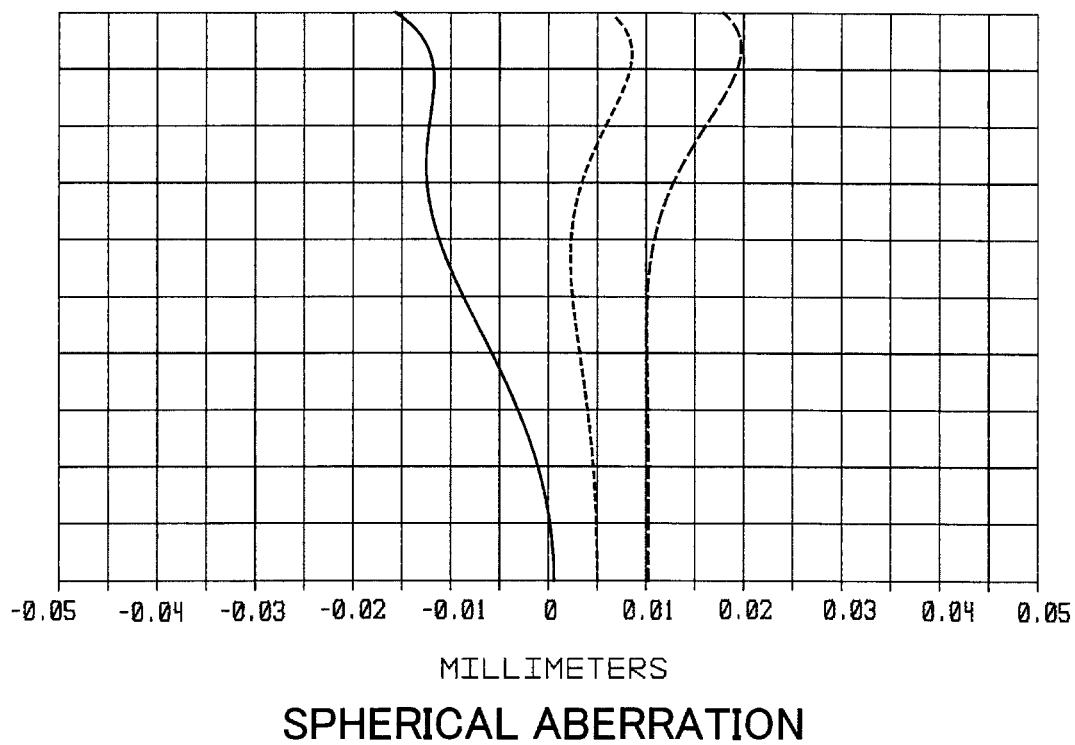
FIG. 5 is a diagram showing a spherical aberration of the image pickup lens according to Embodiment 2.
Figure 6:
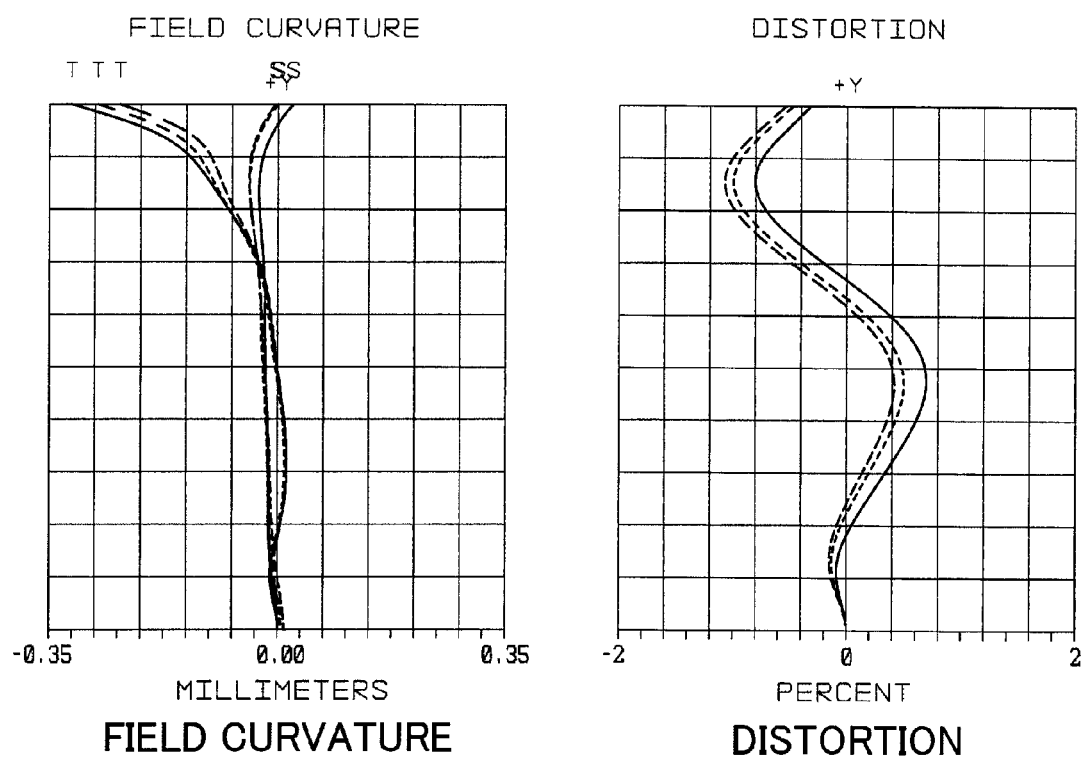
FIG. 6 is a diagram showing a field curvature and a distortion of the image pickup lens according to Embodiment 2.
Figure 7:
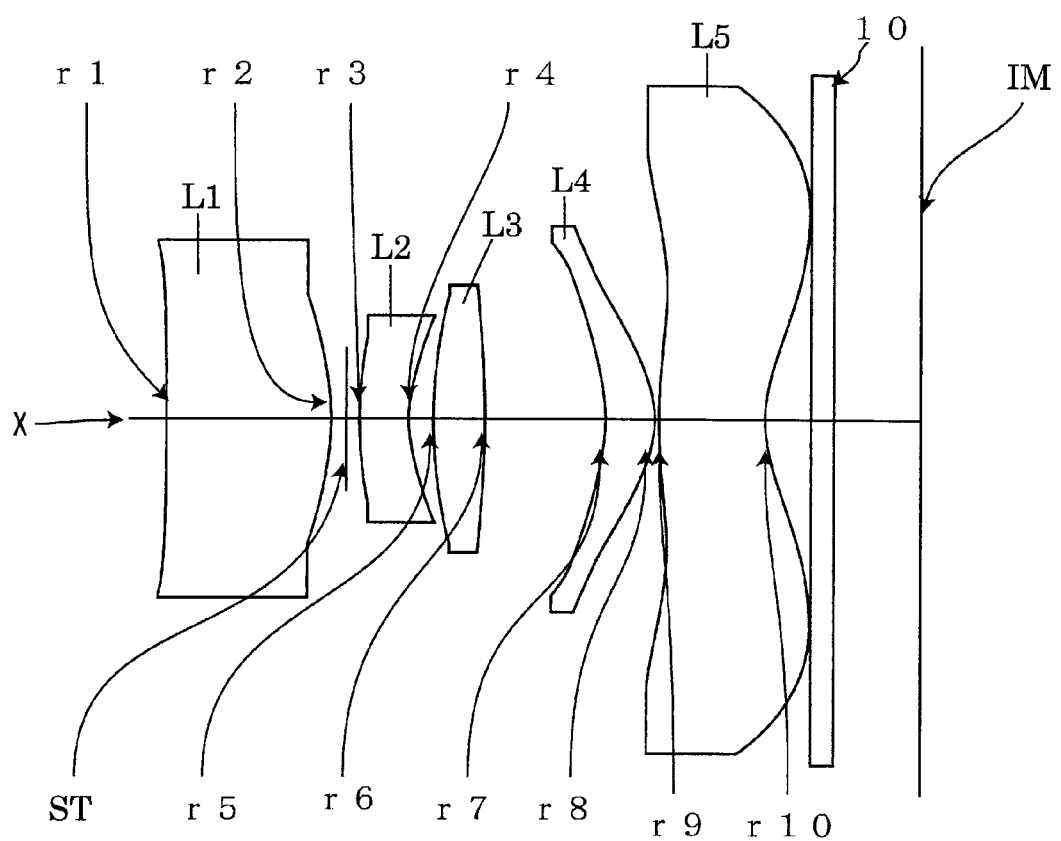
FIG. 7 is a configuration diagram of an image pickup lens according to Embodiment 3 of an embodiment of the present invention.

FIG. 5 shows a spherical aberration of the image pickup lens of Embodiment 2. FIG. 6 shows a field curvature and a distortion of the image pickup lens of Embodiment 2. As shown in FIG. 5 and FIG. 6, various aberrations are satisfactorily corrected in the image pickup lens of the Embodiment 2.

Embodiment 3

Basic lens data will be shown in Table 3 below.

TABLE 3

| f = 6.0268 mm | | Fno = 3.00 | | ω = 39.04° |
|---|---|---|---|---|
| | | Surface data | | |
| Surface No. i | Curvature radius r | Surface distance d | Refractive index Nd | Abbe number ν d |
| (Object surface) | Infinity | 450.0 | | |
| 1* | −400 | 2.1870 | 1.5346 | 56.16 |
| 2* | −3.4091 | 0.2056 | | |
| Stop | Infinity | 0.1672 | | |
| 3* | 5.3660 | 0.6639 | 1.634 | 23.9 |
| 4* | 2.2956 | 0.3238 | | |
| 5* | 6.6288 | 0.6825 | 1.5346 | 56.16 |
| 6* | −16.3429 | 1.6121 | | |
| 7* | −2.7222 | 0.6456 | 1.5346 | 56.16 |
| 8* | −1.5772 | 0.0569 | | |
| 9* | 5.6191 | 1.4146 | 1.5346 | 56.16 |
| 10* | 1.7763 | 0.62 | | |
| 11 | ∞ | 0.300 | 1.5167 | 64.19 |
| 12 | ∞ | 1.1515 | | |
| (Image plane) | ∞ | | | |

| Focal length of each lens |
|---|
| f1 = 6.392 |
| f2 = −6.829 |
| f3 = 8.876 |
| f4 = 5.835 |
| f5 = −5.552 |

| Aspheric data | |
|---|---|
| First surface | k = 0.00, A4 = −3.3623e−003, A6 = 1.5584e−004, A8 = −4.8736e−005, A10 = 3.90069e−006, A12 = 0, A14 = 0, A16 = 0 |
| Second surface | k = −6.4484, A4 = 9.8646e−003, A6 = −8.3812e−003, A8 = 3.3896e−003, A10 = −7.8633e−004, A12 = 8.0759e−005, A14 = 0, A16 = 0 |
| Third surface | k = −9.7224, A4 = 1.081e−002, A6 = −6.1603e−003, A8 = 1.1717e−003, A10 = −2.4139e−006, A12 = 0, A14 = 0, A16 = 0 |

TABLE 3-continued

| | |
|---|---|
| Fourth surface | k = −1.5699, A4 = −2.77e−002, A6 = 1.23e−002, A8 = −4.7933e−003, A10 = 1.15e−003, A12 = −1.3477e−004, A14 = 0, A16 = 0 |
| Fifth surface | k = 0.00, A4 = −6.5079e−003, A6 = 2.7239e−003, A8 = 7.0239e−005, A10 = 4.1618e−005, A12 = −2.0729e−005, A14 = 0, A16 = 0 |
| Sixth surface | k = 0.00, A4 = −5.2752e−004, A6 = −6.8032e−004, A8 = −3.4845e−004, A10 = 2.0978e−004, A12 = −8.5076e−006, A14 = 0, A16 = 0 |
| Seventh surface | k = 0.1681, A4 = 3.26e−002, A6 = −1.4164e−003, A8 = −1.7311e−004, A10 = 4.5567e−005, A12 = −3.1961e−006, A14 = 0, A16 = 0 |
| Eighth surface | k = −2.3537, A4 = 1.4097e−004, A6 = 1.4685e−003, A8 = 6.2108e−005, A10 = −4.0905e−005, A12 = 1.584e−006, A14 = 1.7365e−007, A16 = 0 |
| Ninth surface | k = −5.2912, A4 = −1.83e−002, A6 = 1.3137e−003, A8 = −2.8475e−005, A10 = 0, A12 = 0, A14 = 0, A16 = 0 |
| Tenth surface | k = −5.7931, A4 = −9.4451e−003, A6 = 6.8351e−004, A8 = −4.6468e−005, A10 = 1.3559e−006, A12 = −1.19427e−008, A14 = 0, A16 = 0 |

Value of each conditional expression $r1/f = -65.47$ (1)

$r2/r3 = -0.6353$ (2)

$r3/r4 = 2.3374$ (3)

$r8/r10 = -0.8879$ (4)

$r1/r2 = 117.33$ (5)

$r3/f = 0.8903$ (6)

As seen from above, the image pickup lens according to Embodiment 3 satisfies above-mentioned conditional expressions (1) through (6). Further, a distance TTL on the optical axis X from the object side surface of the first lens L1 to the image plane IM (air-converted distance) is 9.93 mm. A ratio TTL/(2IH) with the maximum image height (IH) is 1.002, so that downsizing is achieved.

Further, a ratio of the focal length of each lens with respect to the focal length of the overall system is as follows.

$f1/f = 1.060$
$f2/f = -1.133$
$f3/f = 1.472$
$f4/f = 0.968$
$f5/f = -0.921$

As explained above, by setting the focal length of each lens to a value close to the focal length of the overall system, or to a value longer than the focal length of the overall system, increase of the manufacturing error sensitivity is suppressed.

Figure 8:
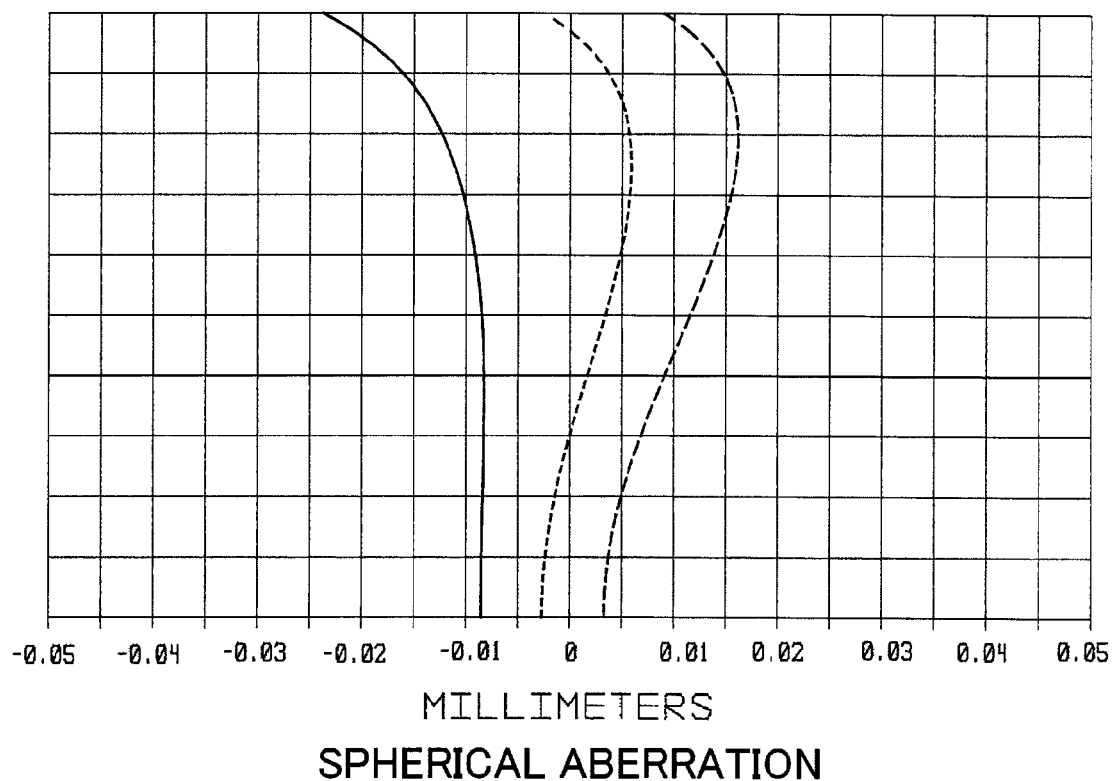
FIG. 8 is a diagram showing a spherical aberration of the image pickup lens according to Embodiment 3.
Figure 9:
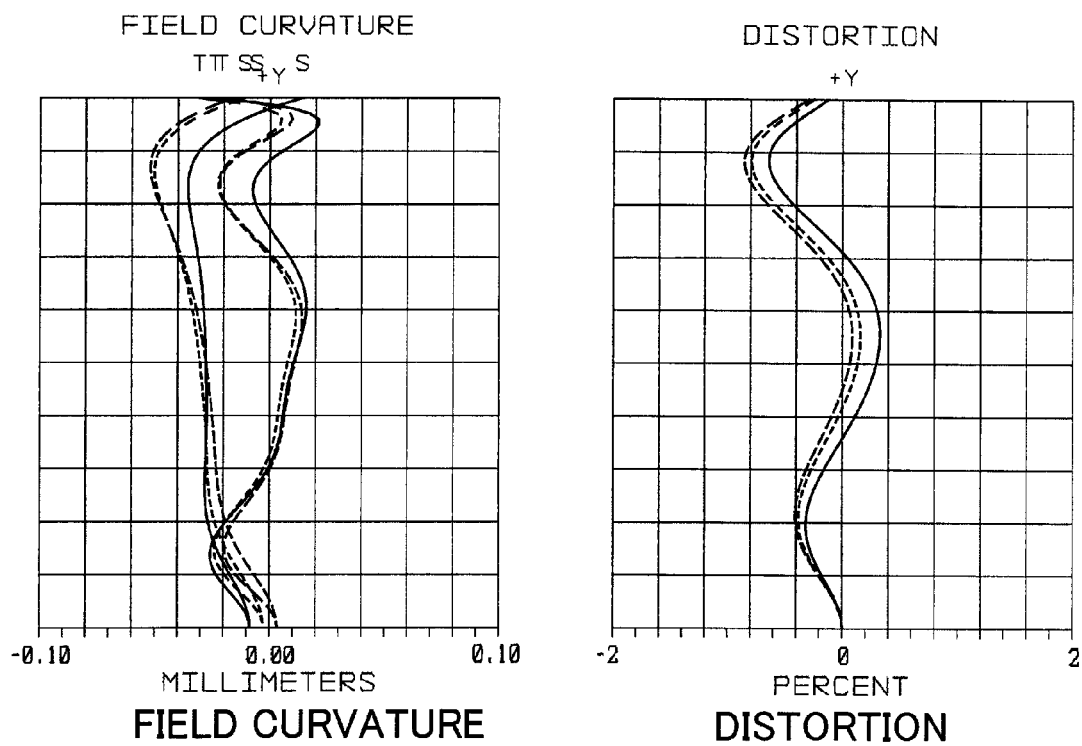
FIG. 9 is a diagram showing a field curvature and a distortion of the image pickup lens according to Embodiment 3.
Figure 10:
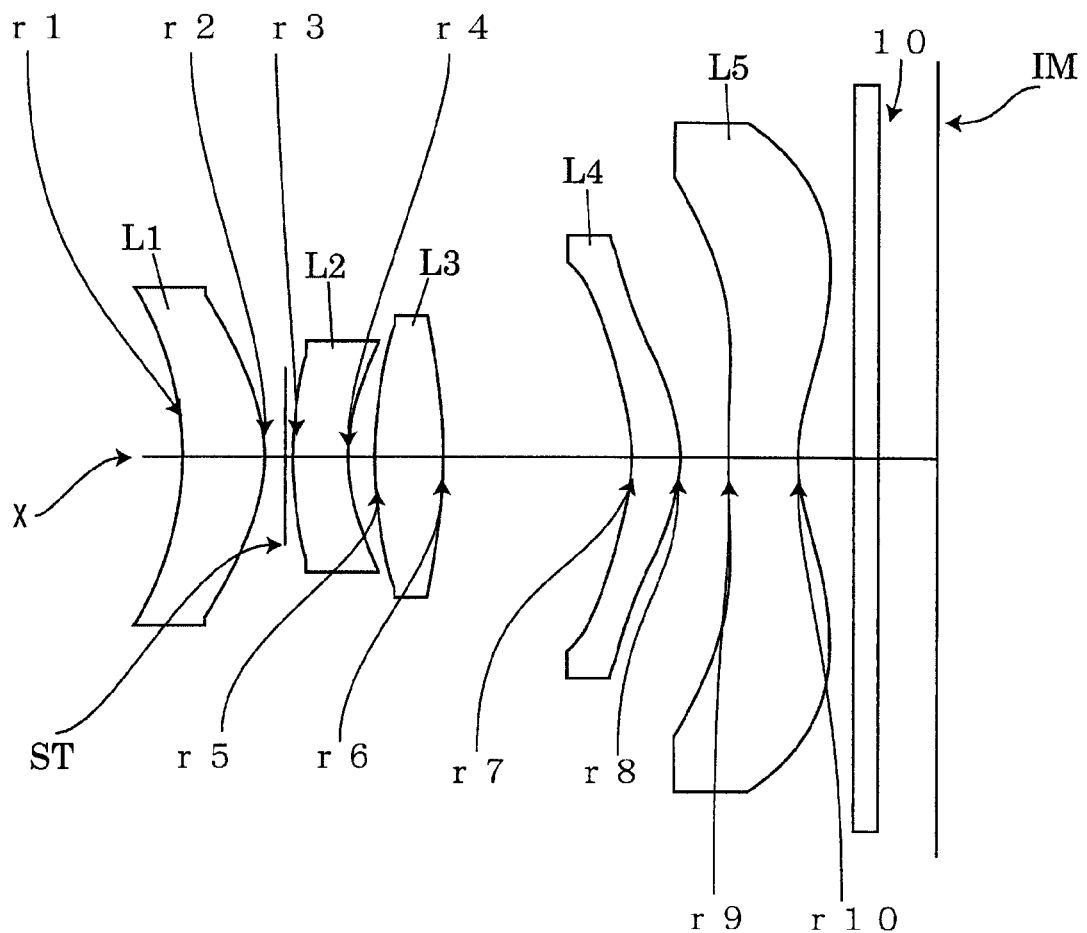
FIG. 10 is a configuration diagram of an image pickup lens according to Embodiment 4 of an embodiment of the present invention.

FIG. 8 shows a spherical aberration of the image pickup lens of Embodiment 3. FIG. 9 shows a field curvature and a distortion of the image pickup lens of Embodiment 3. As shown in FIG. 8 and FIG. 9, various aberrations are satisfactorily corrected in the image pickup lens of the Embodiment 3.

Embodiment 4

Basic lens data will be shown in Table 4 below.

TABLE 4

| f = 6.8118 mm | | Fno = 3.00 | | ω = 36.01° |
|---|---|---|---|---|
| | | Surface data | | |
| Surface No. i | Curvature radius r | Surface distance d | Refractive index Nd | Abbe number ν d |
| (Object surface) | Infinity | 450.0 | | |
| 1* | −99.0 | 1.0560 | 1.5346 | 56.16 |
| 2* | −6.60 | 0.6896 | | |
| Stop | Infinity | 0.1566 | | |
| 3* | 5.71 | 0.8991 | 1.634 | 23.9 |
| 4* | 2.7193 | 0.2696 | | |
| 5* | 5.8214 | 0.8862 | 1.5346 | 56.16 |
| 6* | −7.3376 | 1.9111 | | |
| 7* | −2.8103 | 0.6306 | 1.5346 | 56.16 |
| 8* | −1.7782 | 0.1790 | | |
| 9* | 7.0620 | 1.6852 | 1.5346 | 56.16 |
| 10* | 2.0338 | 0.70 | | |
| 11 | ∞ | 0.300 | 1.5167 | 64.19 |
| 12 | ∞ | 1.2188 | | |
| (Image plane) | ∞ | | | |

Focal length of each lens f1 = 13.119
f2 = −9.168
f3 = 6.192

TABLE 4-continued f4 = 7.432
f5 = −6.026

Aspheric data

| | |
|---|---|
| First surface | k = 0.00, A4 = −1.525e-004, A6 = 3.361e-004, A8 = −3.163e-005, A10 = 6.801e-006, A12 = 0, A14 = 0, A16 = 0 |
| Second surface | k = −1.362, A4 = 9.231e-003, A6 = −5.031e-003, A8 = 3.173e-003, A10 = −9.14e-004, A12 = 1.019e-004, A14 = 0, A16 = 0 |
| Third surface | k = −25.0742, A4 = 7.532e-003, A6 = −4.112e-003, A8 = 1.242e-003, A10 = −3.085e-004, A12 = 0, A14 = 0, A16 = 0 |
| Fourth surface | k = −1.2197, A4 = −2.555e-002, A6 = 1.168e-002, A8 = −4.839e-003, A10 = 1.154e-003, A12 = −1.348e-004, A14 = 0, A16 = 0 |
| Fifth surface | k = 0.00, A4 = −7.349e-003, A6 = 2.208e-003, A8 = −5.325e-005, A10 = 6.891e-005, A12 = −2.073e-005, A14 = 0, A16 = 0 |
| Sixth surface | k = 0.00, A4 = −8.877e-004, A6 = −5.675e-004, A8 = −4.947e-004, A10 = 2.066e-004, A12 = −8.508e-006, A14 = 0, A16 = 0 |
| Seventh surface | k = 0.1031, A4 = 2.76e-002, A6 = 1.404e-003, A8 = −1.48e-004, A10 = 3.618e-005, A12 = −4.414e-006, A14 = 0, A16 = 0 |
| Eighth surface | k = −2.3623, A4 = 1.73e-003, A6 = 1.125e-003, A8 = 1.111e-005, A10 = −4.242e-005, A12 = 1.621e-006, A14 = 1.555e-007, A16 = 0 |
| Ninth surface | k = 0.8808, A4 = −1.622e-002, A6 = 1.204e-003, A8 = −3.666e-005, A10 = 0, A12 = 0, A14 = 0, A16 = 0 |
| Tenth surface | k = −5.5167, A4 = −7.31e-003, A6 = 5.922e-004, A8 = −4.202e-005, A10 = 1.567e-006, A12 = −2.419e-008, A14 = 0, A16 = 0 |

Value of each conditional expression $r1/f = -14.53$ (1)

$r2/r3 = -1.1558$ (2)

$r3/r4 = 2.0997$ (3)

$r8/r10 = -0.8742$ (4)

$r1/r2 = 15.00$ (5)

$r3/f = 0.8382$ (6)

As seen from above, the image pickup lens according to Embodiment 4 satisfies above-mentioned conditional expressions (1) through (6). Further, a distance TTL on the optical axis X from the object side surface of the first lens L1 to the image plane IM (air-converted distance) is 10.47 mm. A ratio TTL/(2IH) with the maximum image height (IH) is 1.057, so that downsizing is achieved.

Further, a ratio of the focal length of each lens with respect to the focal length of the overall system is as follows.

$f1/f = 1.925$
$f2/f = -1.345$
$f3/f = 0.909$
$f4/f = 1.091$
$f5/f = -0.884$

As explained above, by setting the focal length of each lens to a value close to the focal length of the overall system, or to a value longer than the focal length of the overall system, increase of the manufacturing error sensitivity is suppressed.

Figure 11:
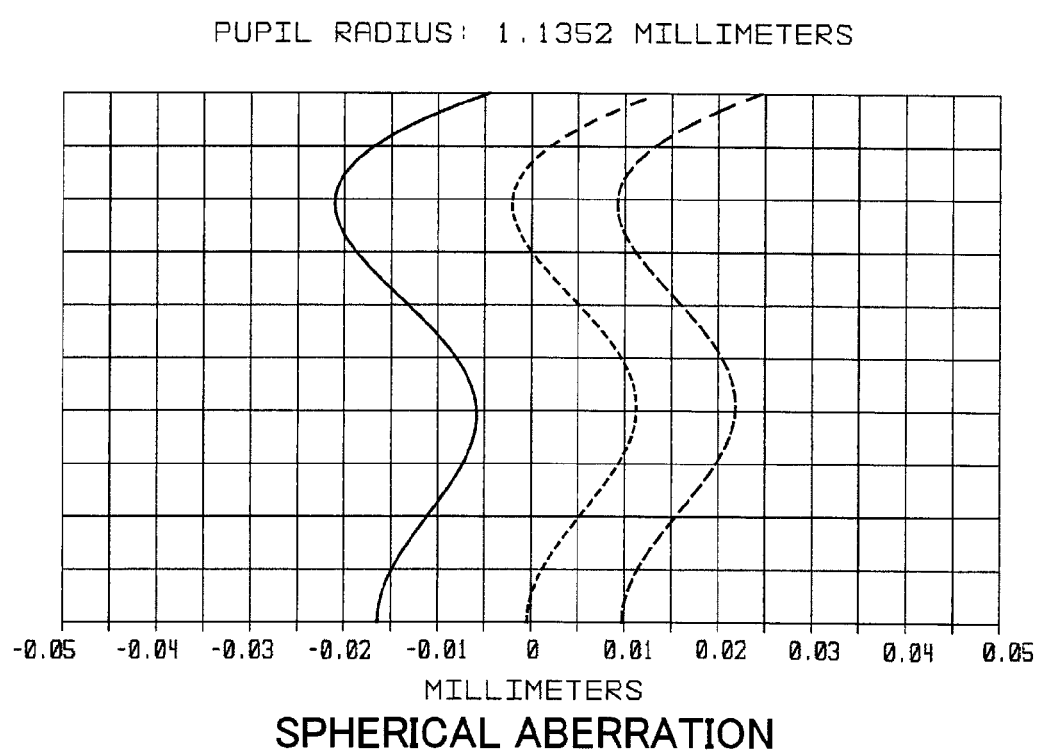
FIG. 11 is a diagram showing a spherical aberration of the image pickup lens according to Embodiment 4.
Figure 12:
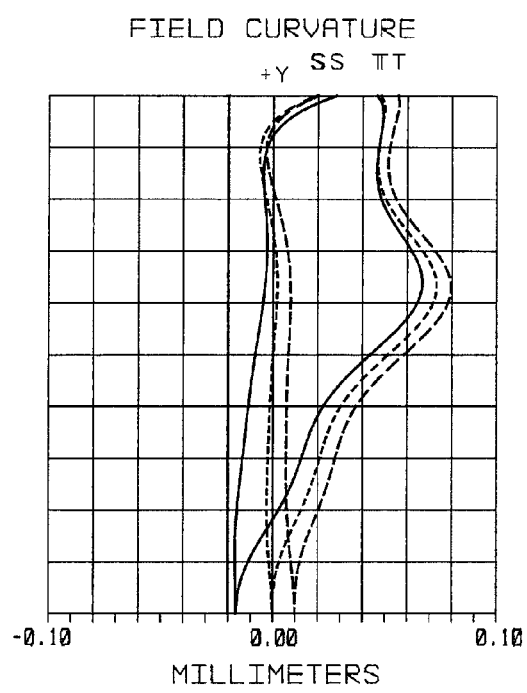
FIG. 12 is a diagram showing a field curvature and a distortion of the image pickup lens according to Embodiment 4.
Figure 12:
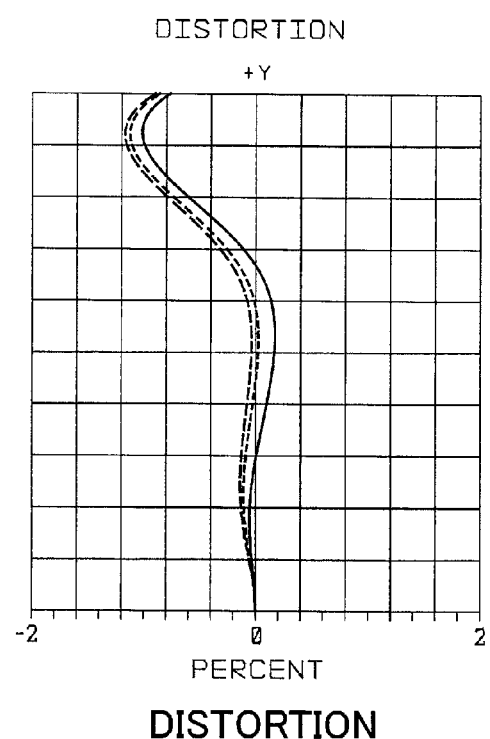
Figure 13:
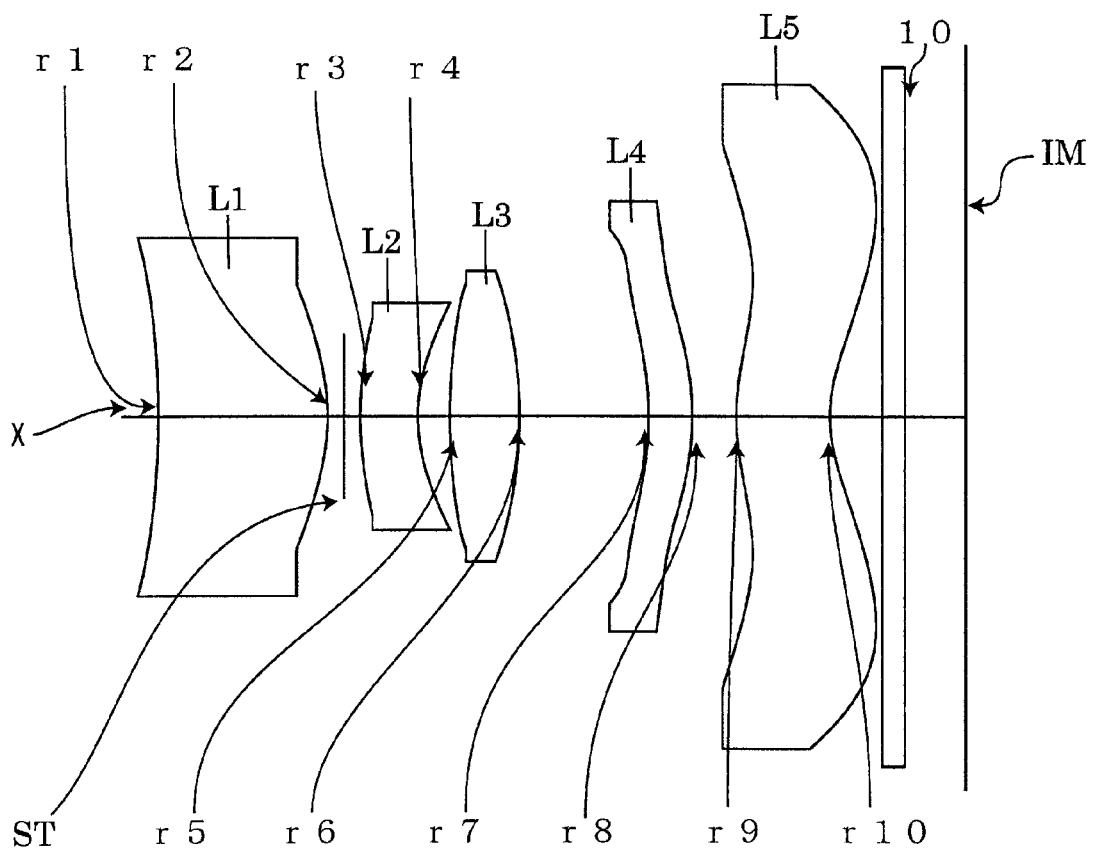
FIG. 13 is a configuration diagram of an image pickup lens according to Embodiment 5 of an embodiment of the present invention.

FIG. 11 shows a spherical aberration of the image pickup lens of Embodiment 4. FIG. 12 shows a field curvature and a distortion of the image pickup lens of Embodiment 4. As shown in FIG. 11 and FIG. 12, various aberrations are satisfactorily corrected in the image pickup lens of the Embodiment 4.

Embodiment 5

Basic lens data will be shown in Table 5 below.

TABLE 5

| f = 6.6930 mm | | Fno = 3.01 | | ω = 36.49° |
|---|---|---|---|---|
| | | Surface data | | |
| Surface No. i | Curvature radius r | Surface distance d | Refractive index Nd | Abbe number ν d |
| (Object surface) | Infinity | 450.0 | | |
| 1* | −21.5966 | 2.0589 | 1.5346 | 56.16 |
| 2* | −3.1297 | 0.2540 | | |
| Stop | Infinity | 0.1547 | | |
| 3* | 5.8655 | 0.7924 | 1.634 | 23.9 |
| 4* | 2.3344 | 0.3575 | | |
| 5* | 6.5901 | 0.8856 | 1.5346 | 56.16 |
| 6* | −7.7340 | 1.6752 | | |

TABLE 5-continued

| | | | | |
|---|---|---|---|---|
| 7* | −2.6067 | 0.6300 | 1.5346 | 56.16 |
| 8* | −1.715 | 0.1735 | | |
| 9* | −196.6536 | 1.7850 | 1.5346 | 56.16 |
| 10* | 2.7 | 0.700 | | |
| 11 | ∞ | 0.300 | 1.5167 | 64.19 |
| 12 | ∞ | 0.8842 | | |
| (Image plane) | ∞ | | | |

Focal length of each lens f1 = 6.562
f2 = −6.624
f3 = 6.774
f4 = 7.489
f5 = −4.945

Aspheric data

| | |
|---|---|
| First surface | k = 0.00, A4 = −3.1042e−003, A6 = 1.9145e−004, A8 = −3.8951e−005, A10 = 4.2948e−006, A12 = 0, A14 = 0, A16 = 0 |
| Second surface | k = −5.408, A4 = 9.6983e−003, A6 = −7.9283e−003, A8 = 3.4219e−003, A10 = −8.3443e−004, A12 = 8.731e−005, A14 = 0, A16 = 0 |
| Third surface | k = −9.2425, A4 = 1.13e−002, A6 = −5.2551e−003, A8 = 1.2152e−003, A10 = −1.842e−004, A12 = 0, A14 = 0, A16 = 0 |
| Fourth surface | k = −1.573, A4 = −2.76e−002, A6 = 1.28e−002, A8 = −4.7722e−003, A10 = 1.1276e−003, A12 = −1.3477e−004, A14 = 0, A16 = 0 |
| Fifth surface | k = 0.00, A4 = −5.97e−003, A6 = 2.3149e−003, A8 = −4.0371e−005, A10 = 6.8928e−005, A12 = −2.0729e−005, A14 = 0, A16 = 0 |
| Sixth surface | k = 0.00, A4 = −1.9031e−004, A6 = −7.7265e−004, A8 = −4.6048e−004, A10 = 1.76e−004, A12 = −8.5075e−006, A14 = 0, A16 = 0 |
| Seventh surface | k = 0.1569, A4 = 2.91e−002, A6 = −1.1831e−003, A8 = −1.1022e−004, A10 = 4.006e−005, A12 = −4.927e−006, A14 = 0, A16 = 0 |
| Eighth surface | k = −2.2085, A4 = 2.1135e−003, A6 = 1.4212e−003, A8 = 4.8726e−005, A10 = −4.0643e−005, A12 = 1.6181e−006, A14 = 1.63e−007, A16 = 0 |
| Ninth surface | k = −5608.824, A4 = −1.64e−002, A6 = 1.2493e−003, A8 = −2.632e−005, A10 = 0, A12 = 0, A14 = 0, A16 = 0 |
| Tenth surface | k = −9.3299, A4 = −9.1806e−003, A6 = 6.6049e−004, A8 = −4.5003e−005, A10 = 1.4986e−006, A12 = −2.0502e−008, A14 = 0, A16 = 0 |

Value of each conditional expression $r1/f = -3.2267$ (1)

$r2/r3 = -0.5335$ (2)

$r3/r4 = 2.5125$ (3)

$r8/r10 = -0.6351$ (4)

$r1/r2 = 6.9003$ (5)

$r3/f = 0.8763$ (6)

As seen from above, the image pickup lens according to Embodiment 5 satisfies above-mentioned conditional expressions (1) through (6). Further, a distance TTL on the optical axis X from the object side surface of the first lens L1 to the image plane IM (air-converted distance) is 10.55 mm. A ratio TTL/(2IH) with the maximum image height (IH) is 1.065, so that downsizing is achieved.

Further, a ratio of the focal length of each lens with respect to the focal length of the overall system is as follows.

f1/f=0.980
f2/f=−0.989
f3/f=1.012
f4/f=1.118
f5/f=−0.738

As explained above, by setting the focal length of each lens to a value close to the focal length of the overall system, or to a value longer than the focal length of the overall system, increase of the manufacturing error sensitivity is suppressed.

Figure 14:
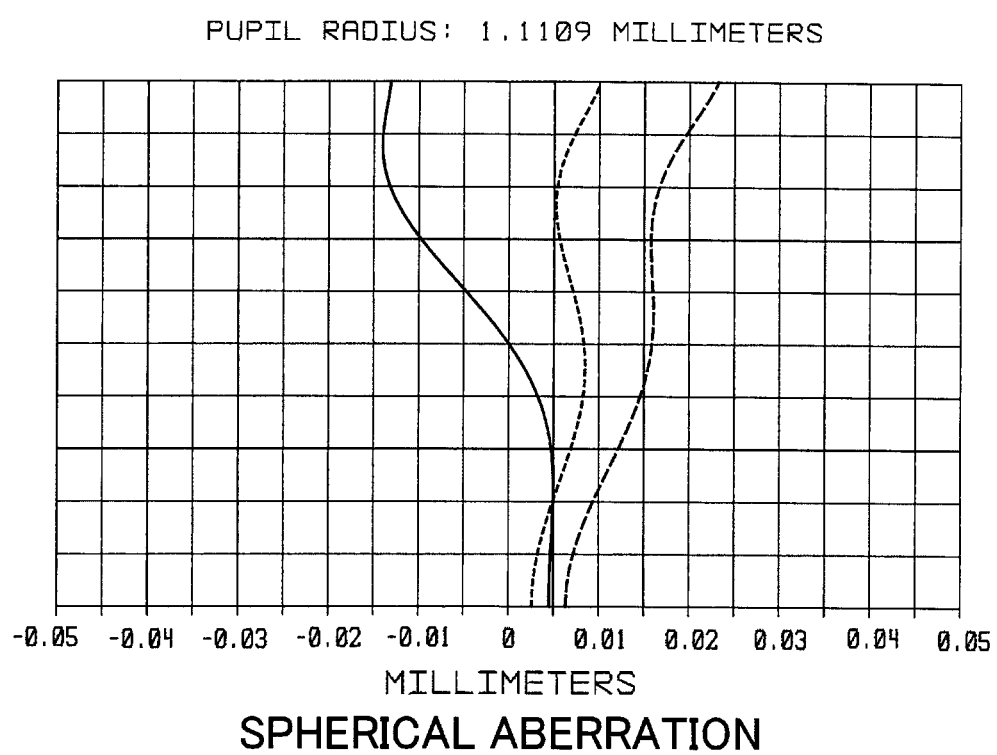
FIG. 14 is a diagram showing a spherical aberration of the image pickup lens according to Embodiment 5.
Figure 15:
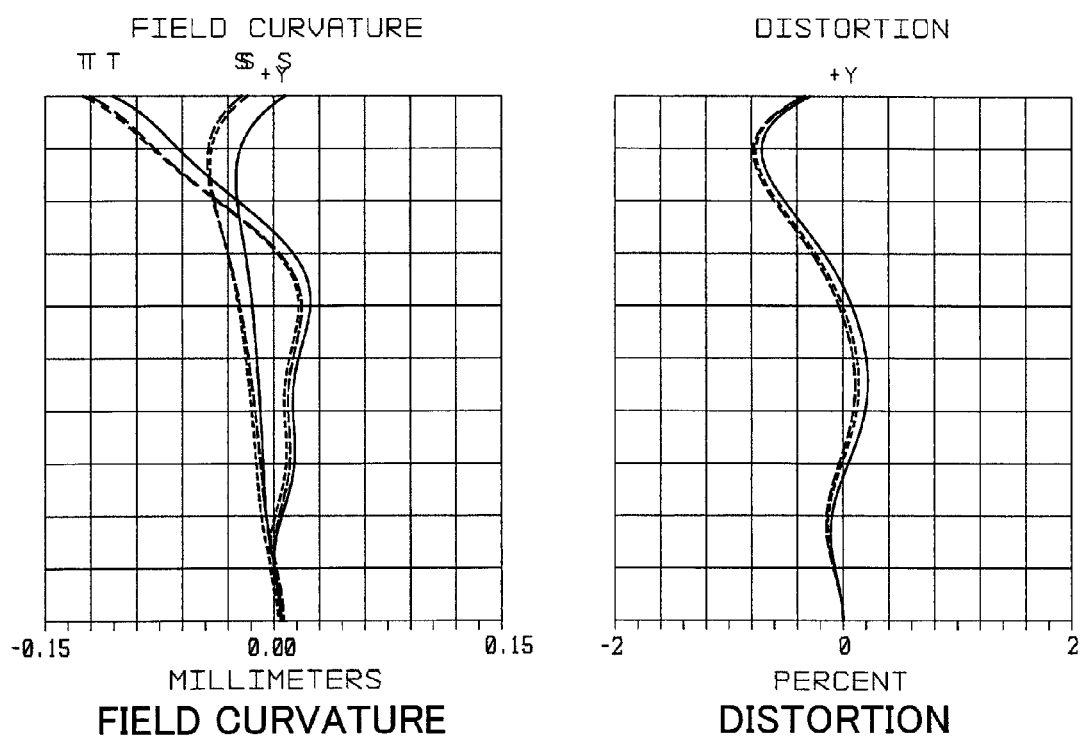
FIG. 15 is a diagram showing a field curvature and a distortion of the image pickup lens according to Embodiment 5.
Figure 16:
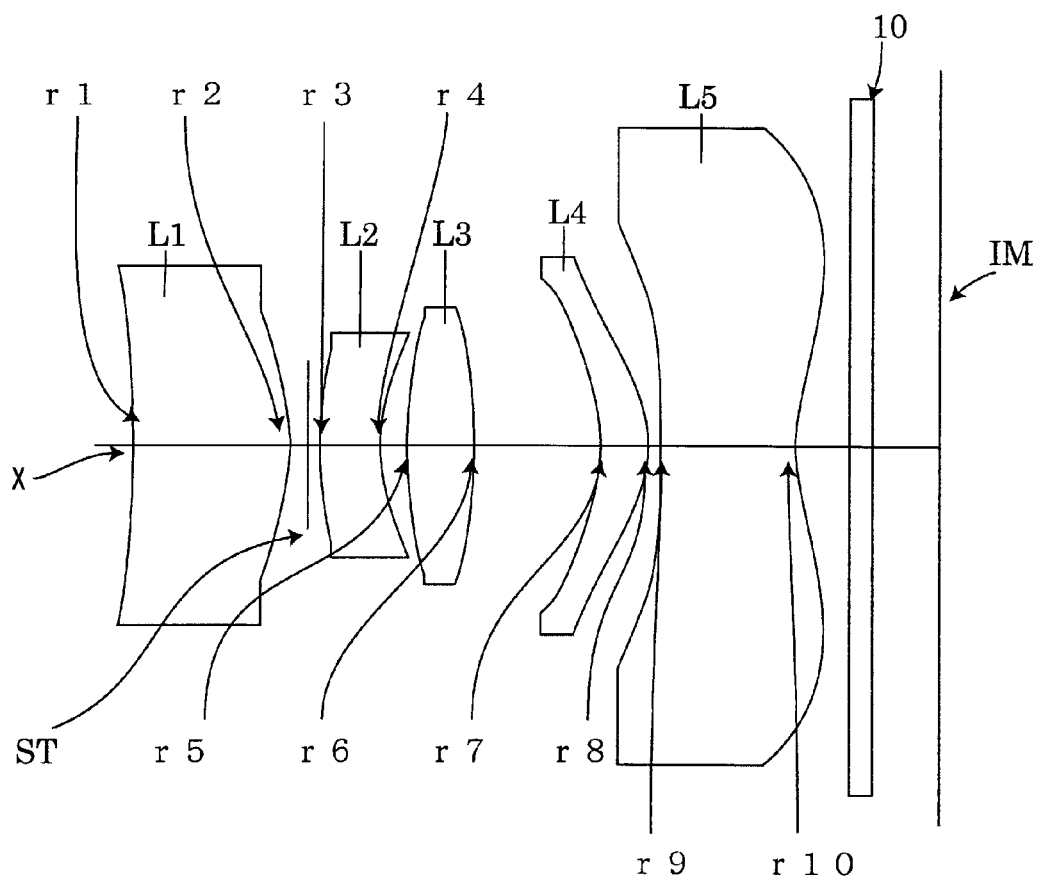
FIG. 16 is a configuration diagram of an image pickup lens according to Embodiment 6 of an embodiment of the present invention.

FIG. 14 shows a spherical aberration of the image pickup lens of Embodiment 5. FIG. 15 shows a field curvature and a distortion of the image pickup lens of Embodiment 5. As shown in FIG. 14 and FIG. 15, various aberrations are satisfactorily corrected in the image pickup lens of the Embodiment 5.

Embodiment 6

Basic lens data will be shown in Table 6 below.

TABLE 6

| f = 6.4496 mm | | Fno = 3.01 | | ω = 37.51° |
|---|---|---|---|---|
| | | Surface data | | |
| Surface No. i | Curvature radius r | Surface distance d | Refractive index Nd | Abbe number ν d |
| (Object surface) | Infinity | Infinity | | |
| 1* | −23.8381 | 2.0814 | 1.5346 | 56.16 |
| 2* | −3.2198 | 0.2686 | | |
| Stop | Infinity | 0.1542 | | |
| 3* | 5.5559 | 0.7547 | 1.634 | 23.9 |
| 4* | 2.3033 | 0.3485 | | |
| 5* | 6.5145 | 0.7682 | 1.5346 | 56.16 |
| 6* | −10.3933 | 1.7623 | | |
| 7* | −2.7768 | 0.6682 | 1.5346 | 56.16 |
| 8* | −1.7258 | 0.2189 | | |
| 9* | 7.4922 | 1.4010 | 1.5346 | 56.16 |
| 10* | 1.9993 | 0.620 | | |
| 11 | ∞ | 0.300 | 1.5167 | 64.19 |
| 12 | ∞ | 1.0383 | | |
| (Image plane) | ∞ | | | |

Focal length of each lens f1 = 6.698
f2 = −6.743
f3 = 7.579
f4 = 6.950
f5 = −5.577

Aspheric data

| First surface | k = 0.00, A4 = −3.116e−003, A6 = 1.998e−004, A8 = −4.002e−005, A10 = 4.143e−006, A12 = 0, A14 = 0, A16 = 0 |
|---|---|
| Second surface | k = −5.458, A4 = 9.844e−003, A6 = −7.737e−003, A8 = 3.355e−003, A10 = −8.438e−004, A12 = 9.244e−005, A14 = 0, A16 = 0 |
| Third surface | k = −8.922, A4 = 1.146e−002, A6 = −5.176e−003, A8 = 1.341e−003, A10 = −1.95e−004, A12 = 0, A14 = 0, A16 = 0 |
| Fourth surface | k = −1.546, A4 = −2.734e−002, A6 = 1.276e−002, A8 = −4.772e−003, A10 = 1.143e−003, A12 = −1.348e−004, A14 = 0, A16 = 0 |
| Fifth surface | k = 0.00, A4 = −6.495e−003, A6 = 2.34e−003, A8 = −4.2e−005, A10 = 7.978e−005, A12 = −2.073e−005, A14 = 0, A16 = 0 |
| Sixth surface | k = 0.00, A4 = −6.994e−006, A6 = −5.544e−004, A8 = −4.243e−004, A10 = 1.825e−004, A12 = −8.508e−006, A14 = 0, A16 = 0 |
| Seventh surface | k = 0.1675, A4 = 3.094e−002, A6 = −1.255e−003, A8 = −1.434e−004, A10 = 3.981e−005, A12 = −3.985e−006, A14 = 0, A16 = 0 |
| Eighth surface | k = −2.579, A4 = 2.389e−003, A6 = 1.41e−003, A8 = 4.826e−005, A10 = −4.132e−005, A12 = 1.461e−006, A14 = 1.361e−007, A16 = 0 |
| Ninth surface | k = −3.456, A4 = −1.749e−002, A6 = 1.277e−003, A8 = −3.048e−005, A10 = 0, A12 = 0, A14 = 0, A16 = 0 |
| Tenth surface | k = −6.371, A4 = −8.844e−003, A6 = 6.623e−004, A8 = −4.574e−005, A10 = 1.45e−006, A12 = −1.616e−008, A14 = 0, A16 = 0 |

Value of each conditional expression $r1/f = -3.6960$ (1)

$r2/r3 = -0.5795$ (2)

$r3/r4 = 2.4152$ (3)

$r8/r10 = -0.8632$ (4)

$r1/r2 = 7.4034$ (5)

$r3/f = 0.8614$ (6)

As seen from above, the image pickup lens according to Embodiment 6 satisfies above-mentioned conditional expressions (1) through (6). Further, a distance TTL on the optical axis X from the object side surface of the first lens L1 to the image plane IM (air-converted distance) is 10.28 mm. A ratio TTL/(2IH) with the maximum image height (IH) is 1.037, so that downsizing is achieved.

Further, a ratio of the focal length of each lens with respect to the focal length of the overall system is as follows.

f1/f = 1.038
f2/f = −1.045
f3/f = 1.175
f4/f = 1.077
f5/f = −0.864

As explained above, by setting the focal length of each lens to a value close to the focal length of the overall system, or to a value longer than the focal length of the overall system, increase of the manufacturing error sensitivity is suppressed.

Figure 17:
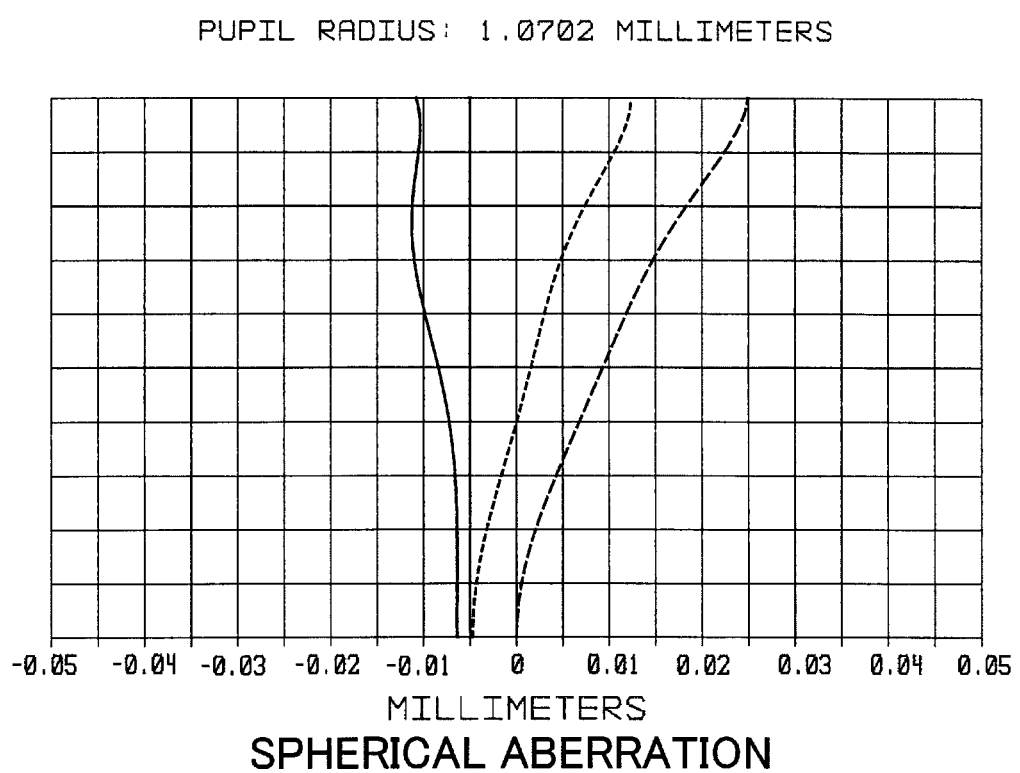
FIG. 17 is a diagram showing a spherical aberration of the image pickup lens according to Embodiment 6.
Figure 18:
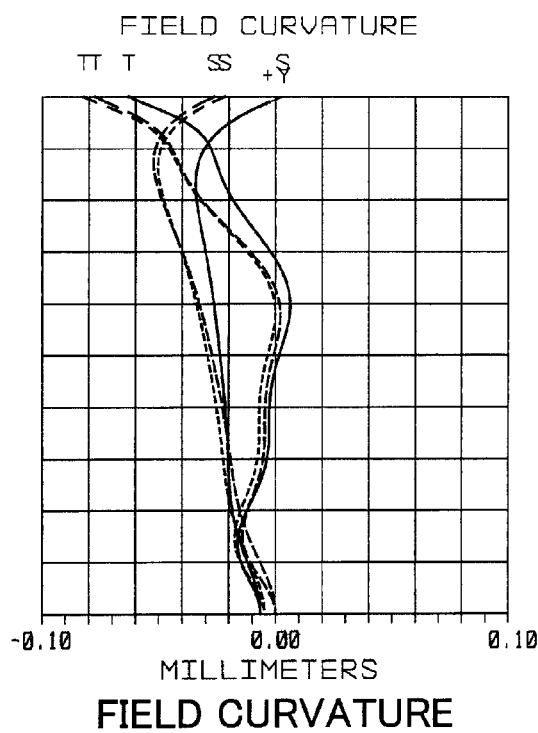
FIG. 18 is a diagram showing a field curvature and a distortion of the image pickup lens according to Embodiment 6.
Figure 18:
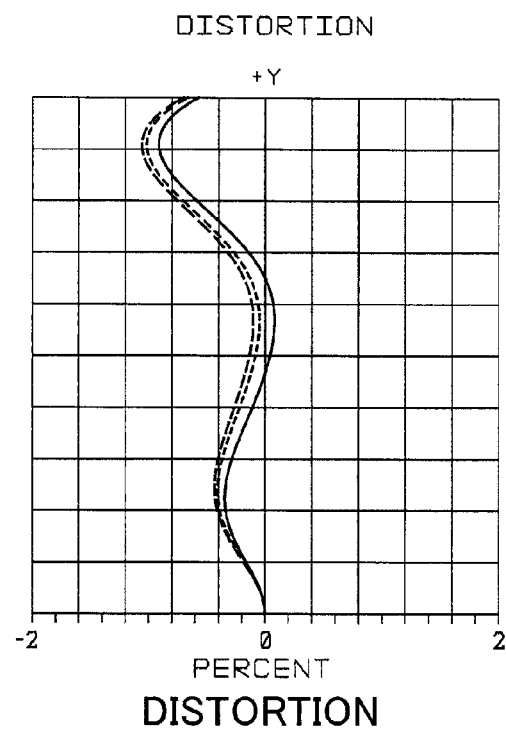

FIG. 17 shows a spherical aberration of the image pickup lens of Embodiment 6. FIG. 18 shows a field curvature and a distortion of the image pickup lens of Embodiment 6. As shown in FIG. 17 and FIG. 18, various aberrations are satisfactorily corrected in the image pickup lens of the Embodiment 6.

Further, the image pickup lenses of the present embodiments all use plastic material, so that they are easy to reduce cost and are suitable for mass-production. Further, the plastic material used is common for the first lens, the third lens, the fourth lens, and the fifth lens, so that it has an advantage of making manufacturing easy.

The half angle of field ω of each image pickup lens of Embodiments 1 through 6 is 38.1°, 42.8°, 39.4°, 36.0°, 36.4°, and 37.5°, respectively, so that widening of the angle is achieved. Further, the distortion, which had heretofore been incompatible with widening of the angle, is suppressed to within ±1.2%, and brightness to the extent of Fno 3.0 is also achieved.

According to the image pickup lenses of the present embodiments, it is possible to provide the image pickup lens capable of achieving widening of angle, brightness, and reduction of distortion at the same time, which had been difficult conventionally, and also with various aberrations satisfactorily corrected. Therefore, when the image pickup lenses of the present embodiments are applied to an image scanning optical system such as a scanner, a copying machine and the like, and to an imaging optical system such as a network camera, a security camera, a car-mounted camera, a game machine, a digital still camera, a portable telephone, an information terminal, a smartphone and the like, both high functionality and downsizing can be achieved.

INDUSTRIAL APPLICABILITY

The image pickup lens of the present invention may be suitably applied to the image pickup lens for devices that require downsizing or favorable correcting ability of various aberrations, and require comparatively wide angle of field, for example, to the scanner, the copying machine, the network camera and the like. Further, the image pickup lens of the present invention is not restricted to the above-mentioned devices, and may also be used to the security camera, the car-mounted camera, the game machine and the digital still camera, and also to the imaging devices built-in to the information terminal devices such as the portable telephone, the smartphone and the like.

The effects of the present invention are as follows.

With the present invention, it becomes possible to provide the image pickup lens seeking to satisfy both the downsizing and the favorable correction of aberrations, especially the correction of the distortion, while maintaining the F-value low, and having relatively wide angle of field.

What is claimed is:

1. An image pickup lens, comprising, in order from an object side to an image side:
    a first lens having a positive refractive power with a concave surface facing the object side;
    an aperture stop;
    a second lens having a negative refractive power with a concave surface facing the image side;
    a third lens having a positive refractive power;
    a fourth lens having a positive refractive power with a concave surface facing the object side; and
    a fifth lens having a negative refractive power with a concave surface facing the image side.

2. The image pickup lens according to claim 1, satisfying a following conditional expression:

$$-70.0 < r1/f < 0 \tag{1}$$

where
r1: curvature radius of object side surface of first lens
f: focal length of overall optical system.

3. The image pickup lens according to claim 1, satisfying following conditional expressions:

$$-1.20 < r2/r3 < -0.40 \tag{2}$$

$$1.56 < r3/r4 < 3.0 \tag{3}$$

where
r2: curvature radius of image side surface of first lens
r3: curvature radius of object side surface of second lens
r4: curvature radius of image side surface of second lens.

4. The image pickup lens according to claim 1, satisfying a following conditional expression:

$$-2.0 < r8/r10 < -0.63 \tag{4}$$

where
r8: curvature radius of image side surface of fourth lens
r10: curvature radius of image side surface of fifth lens.

5. The image pickup lens according to claim 1, satisfying a following conditional expression:

$$1.0 < r1/r2 < 120. \tag{5}$$

6. The image pickup lens according to claim 1, satisfying a following conditional expression:

$$0.50 < r3/f < 1.20. \tag{6}$$

7. The image pickup lens according to claim 2, satisfying following conditional expressions:

$$-1.20 < r2/r3 < -0.40 \tag{2}$$

$$1.56 < r3/r4 < 3.0 \tag{3}$$

where
r2: curvature radius of image side surface of first lens
r3: curvature radius of object side surface of second lens
r4: curvature radius of image side surface of second lens.

8. The image pickup lens according to claim 2, satisfying a following conditional expression:

$$-2.0 < r8/r10 < -0.63 \tag{4}$$

where
r8: curvature radius of image side surface of fourth lens
r10: curvature radius of image side surface of fifth lens.

9. The image pickup lens according to claim 2, satisfying a following conditional expression:

$$1.0 < r1/r2 < 120. \tag{5}$$

10. The image pickup lens according to claim 2, satisfying a following conditional expression:

$$0.50 < r3/f < 1.20. \tag{6}$$

* * * * *